3,112,177
METHOD OF SEPARATING AMMONIA FROM HYDROGEN CYANIDE
Seiichi Fujise, Kamakura City, Eiji Otsuka and Nobuya Nagai, Fujisawa City, and Takanobu Numata, Kamakura City, Japan, assignors to Toyo Koatsu Industries, Inc., Tokyo, Japan, a corporation of Japan
Filed Nov. 4, 1960, Ser. No. 67,262
Claims priority, application Japan Nov. 11, 1959
17 Claims. (Cl. 23—151)

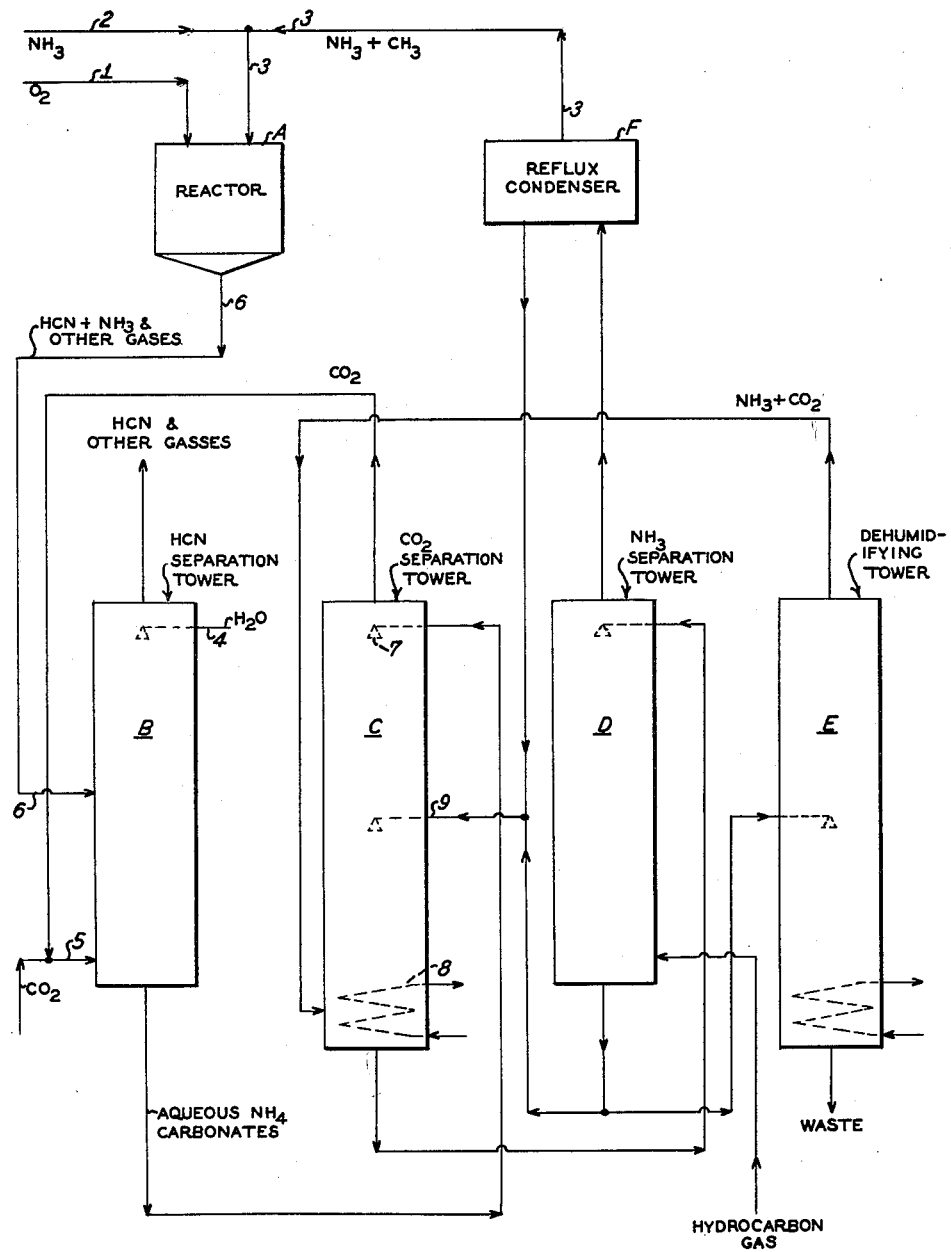
INVENTORS
SEIICHI FUJISE
EIJI OTSUKA
NOBUYA NAGAI
TAKANOBU NUMATA
BY *Fisher, Christen & Goodson*
ATTORNEYS

United States Patent Office 3,112,177
Patented Nov. 26, 1963

The present invention relates generally to an improved chemical process and it relates more particularly to an improved method for the separation of hydrogen cyanide and ammonia from a mixture of gases containing the same and specifically from the reaction product in the synthesis of hydrocyanic acid.

In the manufacture of hydrocyanic acid by the self-sustaining combustion of ammonia, methane and oxygen, the product of the combustion reaction typically contains the following gases in the designated molar proportions:

| | | | |
|---|---|---|---|
| HCN | 8.04 | $CH_4$ | 1.69 |
| $NH_3$ | 5.36 | $N_2$ | 1.29 |
| $CO_2$ | 2.98 | $H_2O$ | 26.42 |
| CO | 15.39 | $C_2H_2$ | 0.79 |
| $H_2$ | 38.04 | | |

Where the reaction is effected in the presence of a platinum catalyst as in the Andrussow process the reaction product contains the following gases in the designated molar proportions:

| | | | |
|---|---|---|---|
| HCN | 6.70 | $CH_4$ | 0.88 |
| $NH_3$ | 1.76 | $N_2$ | 54.05 |
| $CO_2$ | 0.33 | $H_2O$ | 23.98 |
| CO | 3.77 | $O_2$ | 0.07 |
| $H_2$ | 8.46 | | |

It is apparent that in both processes and particularly in the uncatalyzed process of producing hydrogen cyanide there is present in the reaction product a relatively large proportion of unreacted ammonia. In order that the process for synthesizing the hydrogen cyanide may be practiced with efficiency in the complete utilization of starting materials it is necessary to recover the unreacted ammonia and recycle the same. Several methods have been employed and proposed but these possess numerous drawbacks and disadvantages. In accordance with one of these methods an alkali is employed to convert hydrocyanic acid to the alkaline cyanide and to recover the ammonia in the form of an aqueous solution thereof. This is unsuitable for making hydrogen cyanide since the hydrocyanic acid is converted to a stable cyanide which is contaminated by alkaline carbonates formed from the carbon dioxide entrained in the reaction gases.

Ammonia has also been absorbed by the use of sulphuric acid and although this method is suitable for scrubbing off ammonia, the resulting ammonium sulphate is highly stable so that obtaining and recycling ammonia is economically impossible. Other processes employ various organic and inorganic acids and other materials as absorbents of the hydrogen cyanide and ammonia which are released at different temperatures. These latter processes are characterized by the use of relatively expensive absorbents which are unsuitable for the hydrogen cyanide synthesizing process and by a large energy consumption in the form of steam needed to release the hydrogen cyanide and/or ammonia.

It is thus a principal object of the present invention to provide an improved process for separating ammonia from hydrogen cyanide in a mixture of said gases.

Another object of the present invention is to provide an improved process for the separation of ammonia from hydrogen cyanide in the gaseous reaction mixture resulting from the synthesis of hydrogen cyanide, the ammonia thus separated being in a state suitable for recycling in the hydrogen cyanide synthesis.

Still another object of the present invention is to provide an improved process of the above nature characterized by its high efficiency, economy in the use of materials, the use of materials which are found in or compatible with the hydrogen cyanide synthesis gaseous reaction mixture and low energy consumption.

The above and other objects of the present invention will become apparent from a reading of the following description taken in conjunction with the accompanying drawing which is a diagrammatic flow diagram illustrating an arrangement of apparatus which may be employed in practising the subject process.

A feature of the present invention resides in the separation of the ammonia from a mixture of gases containing ammonia and hydrogen cyanide by subjecting the gaseous mixture to the action of water and carbon dioxide to form an aqueous solution of ammonium carbonates including ammonium carbonate and ammonium bicarbonate (which carbonate and bicarbonate are hereinafter referred to merely as ammonium carbonates) and separating this solution from the remaining gases. The use of carbon dioxide and water is highly advantageous since these are both inexpensive materials which are also present in the hydrogen cyanide synthesis gaseous reaction mixture and thus do not add any difficulties.

It is well-known that hydrocyanic acid is rapidly polymerized in an aqueous ammonia solution at normal temperatures. The aqueous solution obtained from the washing of the synthesized reaction gases containing hydrocyanic acid and ammonia changes to a brownish color in less than a few minutes. However, it has been found that the polymerization of the hydrocyanic acid is extremely lowered when ammonia is combined in the form of carbonates and that, in aqueous ammonium carbonate solution, polymerization of hydrogen cyanide does not occur at temperatures below 70° C. Another important advantage found in the use of carbon dioxide in the separation of ammonia from hydrogen cyanide is that although the solubility of hydrocyanic acid in water in the presence of ammonia is high, it decreases sharply when the ammonia is converted to ammonium carbonates.

Thus, by employing a conventional absorption tower, the ammonia can be easily and efficiently separated from a gaseous mixture containing both hydrogen cyanide and ammonia. In one advantageous procedure, water is introduced into the top of the tower, the gaseous reaction mixture is introduced into the middle of the tower and carbon dioxide is blown into the bottom of the tower. The descending water absorbs substantially all of the ammonia contained in the feed reaction gases and part of the hydrogen cyanide which is present as ammonium cyanide and/or hydrocyanic acid. As the liquor descends into contact with the carbon dioxide the hydrogen cyanide is substantially completely released from the liquor and flows upwardly where it is withdrawn along with the emerging reaction gases which were not absorbed. The liquor is withdrawn from the bottom of the tower and contains very little hydrogen cyanide. The molar ratio of the carbon dioxide blown into the tower to the ammonia contained in the feed reaction gases should be above 1:1, preferably between 1:1 and 5:1, and the amount of water introduced should be sufficient to dissolve all the ammonia in the form of its carbonates. Employing the above apparatus and process an almost complete separation of the ammonia from the hydrogen cyanide was achieved, and the effluent ammonium carbonates solution contained only trace amounts of hydrogen cyanide and was substantially colorless. The hydrocyanic acid loss was only 0.3% by weight of the quantity of hydrogen cyanide in the feed reaction gases, the ammonia loss was only 0.5% by weight of the amount of ammonia in the feed reaction gases, and the amount of ammonia entrained in the outflowing gas was only a trace. By the above procedure, the ammonia was separated from the feed reaction gases in the form of an aqueous carbonate solution of ammonia consisting of ammonium carbonate and ammonium bicarbonate by the use of only carbon dioxide and water. Hydrogen cyanide is obtained in admixture with the remaining unabsorbed gases at the top of the tower and subsequently can be separated by absorption with water in any well-known manner and concentrated as desired.

The liquid effluent of an absorption tower which is operated at normal pressures is a solution of the ammonium carbonates at about a 10% concentration. The use of conventional methods in liberating the ammonia in a condition suitable for re-use in the hydrogen cyanide synthesis can be employed, although such methods are not attractive by reason of their high energy requirements. It is, however, further desirable that the ammonia be freed, without the use of additional chemicals in addition to those used in the overall process and without the use of large quantities of energy. Preferably the ammonia is recovered with the concurrent recovery of the carbon dioxide for recycling to the ammonia absorption unit. It is well-known that, in an aqueous solution containing ammonia and carbon dioxide, as the molar ratio of ammonia to carbon dioxide exceeds about 2, the gas phase ammonia in equilibrium with the solution increases and, as this molar ratio drops below about 2, the concentration of the gas phase carbon dioxide in equilibrium with the solution increases. It has been found that when a gaseous mixture of ammonia and carbon dioxide of various molar ratios is scrubbed with water and an aqueous solution of ammonium carbonates, where the gas mixture has an ammonia to carbon dioxide molar ratio of 1:1 to 1.5:1 and the washing liquid is an aqueous solution of ammonium carbonates having an ammonia to carbon dioxide molar ratio of 1:1 to 1.5:1 and the temperature at the top of the washing tower is between 30° C. and 60° C., the ammonia in the gas mixture is substantially completely absorbed by the washing solution, leaving a substantially pure carbon dioxide which emerges from the top of the carbon dioxide separation or washing tower and which may be recycled for use in the earlier absorption step. It has also been found that the partial pressure of carbon dioxide is very low at temperature below 60° C. in aqueous solutions having molar ratios of ammonia to carbon dioxide above 2.8 and that above 80° C. the molar ratio of the ammonia to carbon dioxide of a solution in equilibrium with the gas phase having a molar ratio of ammonia to carbon dioxide of 1:1 to 2.5:1 exceeds 2.8:1.

A highly superior process has been invented in view of the above ammonia and carbon dioxide properties for the separation of the ammonia and carbon dioxide in a condition for recycling. A gaseous mixture of ammonia and carbon dioxide which has been substantially freed of water by means of a dehumidifying tower is conducted to the bottom of a carbon dioxide separation tower where it flows upwardly in a counter-current direction to a descending aqueous solution of ammonium carbonates introduced at the top of the tower and which is maintained at a temperature of about 50° C. whereby the ammonia is completely absorbed to leave the pure carbon dioxide. The liquid reaching the bottom of the tower is heated to above 80° C. to increase the molar ratio of the ammonia to carbon dioxide therein to above 2.8:1. The effluent liquid of the carbon dioxide separation tower is introduced at a temperature of about 60° C. into the top of an ammonia separation tower where it descends in contact with ascendant methane introduced into the bottom of the tower whereby the ammonia is separated from the solution and leaves the upper part of the tower with the methane. In this instance, besides methane other gaseous hydrocarbons which are materials for hydrocyanic acid synthesis may be blown in the ammonia separation tower.

The methane employed in liberating the ammonia should preferably not be more than that required for the hydrogen cyanide synthesis. It has been found that the optimum operating conditions are achieved when the temperature of the liquid phase in the ammonia separation tower is less than the temperature of the liquid phase in the carbon dioxide separation tower. As a result, the carbon dioxide entrained in the ammonia emerging from the top of the tower is made extremely small and can be separated by passing the gas through a reflux condenser. The molar ratio of ammonia to carbon dioxide in the liquid effluent from the ammonia separation tower is about 2:1 and this solution is sent to the dehumidifier for removal of its water content, where part of it can, dependent upon operating conditions, be recycled to the middle part of the carbon dioxide separation tower.

Referring now to the drawing which illustrates a preferred arrangement of the apparatus for practicing the present improved process, the reference letter A designates the hydrogen cyanide synthesizing apparatus, B the hydrogen cyanide separation tower, C the carbon dioxide separation tower, D the ammonia separation tower, E a dehumidifying tower and F a reflux condenser. The hydrogen cyanide synthesis apparatus A may be any suitable reaction furnace to which oxygen is fed by way of a pipe 1, ammonia by way of a pipe 2, and methane and recovered ammonia by way of a pipe 3 in predetermined proportions to be burned in the furnace to produce a reaction mixture containing hydrogen cyanide, unreacted ammonia, water, carbon dioxide and other gases as aforesaid. It should be noted that the various types of towers and reflux condensers are employed to perform their stated functions in accordance with conventional and well-known design principles.

The reaction gas mixture is conducted into the middle of the hydrogen cyanide separation tower B, the exact operating conditions of which depend upon the concentration and composition of the reaction gas mixture. The upper section of the tower B should preferably be at a temperature between 30° C. and 50° C. and the lower section between 50° C. and 70° C. Inasmuch as the temperature at the middle section of the tower B may be elevated by the condensation of the vapors in the reaction gas, the heat of solution and reaction of the hydrogen cyanide with ammonia, cooling may be required to realize the above tower temperatures. Water is introduced at the top of the tower at 4 and carbon dioxide blown into the bottom of the tower B at 5. The molar ratio of the carbon dioxide introduced at 5 to the ammonia content of the reaction gas fed into the tower through pipe 6 should preferably be between 1:1 and 5:1 and the amount of water employed should be a little more than that required to dissolve the ammonium carbonate and ammonium bicarbonate produced. The hydrogen cyanide released from the lower section of the tower B and from which the ammonia has been separated passes up through the top of the tower for further processing.

The liquid in the bottom of the tower B containing the absorbed ammonia as a solution of the carbonates thereof, that is ammonium carbonate and ammonium bicarbonate, has a molar ratio of ammonia to carbon dioxide of 1:1 to 1.5:1, and it is conducted to the upper section of the carbon dioxide separation tower C and introduced at point 7. The top section of the tower C is maintained preferably at a temperature of 30° C. to 60° C. and the lower section 8 at a temperature of 70° C. to 90° C. A gaseous mixture of ammonia and carbon dioxide originating at a subsequent stage and having an ammonia to carbon dioxide molar ratio of about 2:1 is introduced into the bottom of the tower C, and in ascending the ammonia present in the gaseous mixture is completely absorbed by the descending solution to leave the ammonia-free carbon dioxide, which is re-circulated to the bottom of the tower B.

The molar ratio of ammonia to carbon dioxide in the liquid at the bottom of the tower C is over 2.8:1 and the liquid is conducted and introduced into the top of the ammonia separation tower D. Methane, or other hydrocarbon gas employed in the hydrogen cyanide synthesis, is blown into the bottom of the tower D and liberates ammonia from the counterflowing liquid and flows through the reflux condenser F to the hydrogen cyanide synthesizing apparatus for use. The amount of methane employed should preferably be that required by the synthesis step or less than that amount. In the reflux condenser F any traces of carbon dioxide are condensed as an ammonium solution thereof and recycled to the middle section 9 of the carbon dioxide separation tower C. The temperature in the upper section of the tower D is preferably between 20° C. and 60° C.

The liquid effluent from the bottom of the tower D has a molar ratio of ammonia to carbon dioxide of about 2:1. It is delivered to the dehumidifying tower E, or part of it can, dependent upon operating conditions, be recycled to the middle part of the $CO_2$ separation tower, wherein it is enriched in $NH_3$ content. In the dehumidifying tower E, the dissolved ammonia and carbon dioxide are completely liberated by heating the solution and the gases thus liberated are delivered to the bottom of the carbon dioxide separation tower C. The liquid freed of ammonia and carbon dioxide at the bottom of the tower E is discarded.

It should be noted that various advantages can be realized by conducting some of the process steps at increased pressures. For example, the liquid withdrawn from the bottom of the hydrogen cyanide separation tower B may be conducted under increased pressure to the carbon dioxide separation tower C and from the tower C to the ammonia separation tower D at normal pressures. As a result the concentration of the liquid at the bottom of the tower C at a pressure of 2 kg./cm.$^2$ absolute is 2.5 to 4 times as great as under normal pressure. This facilitates the separation of ammonia in the tower D and permits a reduction in the amount of recycling solution between the towers D and C and/or the amount of methane to be employed. This pressure need not be raised to more than 5.0 kg./cm.$^2$ absolute to realize the full benefits thereof.

The following examples are illustrative of the present invention. All percents are by weight.

*Example 1*

As gas mixture containing 43.1% methane, 21.3% ammonia, 34.2% oxygen and the remainder nitrogen and carbon dioxide were burned by a self-sustaining flame in the synthesizing furnace A to produce a sythesized reaction gas containing 8.04% hydrogen cyanide, 5.36% unreacted ammonia, 2.98% carbon dioxide, 26.42% water and the remainder substantially hydrogen and carbon monoxide. The reaction gas flowed into the middle of the tower B, the upper section of which is at a temperature of 40° C., the middle section 50° C. and the bottom section 60° C. Water was introduced at the top of tower B at the rate of one kilogram per cubic meter of reaction gas. Carbon dioxide was blown into the bottom of the tower B at a molar rate twice that of the ammonia content of the reaction gas. The ammonia was absorbed to form an ammonium carbonate solution in the bottom of the tower B, 99.5% of the ammonia having been absorbed, and the hydrogen cyanide leaves the top of the tower, with its loss amounting to only 0.325%. The liquid at the bottom of the tower B contained 5.09% carbon dioxide and 0.03% hydrogen cyanide and had an ammonia to carbon dioxide molar ratio of 1.49:1. It was conducted to the tower C where it flowed in a counter-current flow to ascending gaseous ammonia and carbon dioxide, the liquid accumulating at the base of the tower C being heated to 80° C. The gas leaving the top of the tower C was 99.9% pure $CO_2$, and the liquid was withdrawn from the bottom of the tower C, cooled to 60° C. and delivered to the top of the tower D. It there had a composition of 5.50% ammonia and 5.08% carbon dioxide and an ammonia to carbon dioxide molar ratio of 2.8:1. In the tower D the full synthesis requirement of methane was blown through the bottom thereof in a counter-current flow to the descending liquid to strip ammonia from the liquid and carry it to the synthesizing apparatus A. The amounts of liquid fed to the tower C at 7 and the tower E were substantially equal and that which recycled both towers C and D through point 9 of the tower C from the bottom of the tower D was about 2.5 times this amount. The liquid flowing from the tower D contained 4.52% ammonia, and 5.08% carbon dioxide, the ammonia to carbon dioxide molar ratio being 2.3:1. The operating temperatures were as follows: the carbon dioxide separation tower C, the upper section 50° C., the middle section 70° C. and the lower section 80° C.; the ammonia separation tower D, the upper section 60° C. and no heating elsewhere; and the dehumidifying tower E, 102° C. at the bottom section and 70° C. at the upper section. The recovery rate of ammonia was over 99.3%.

*Example 2*

The example relates to the case wherein the tower C is operated under high pressure. The aqueous solution of ammonium carbonate and ammonium bicarbonate (ammonia to carbon dioxide molar ratio, 1.5:1, concentration 8.2%) was withdrawn from the tower B and delivered to the tower C at an absolute pressure of 2 kg./cm.$^2$ where the temperature in the bottom section was 85° C. and in the upper section was 50° C. The gas leaving the top of the tower C was 99.9% pure carbon dioxide and the liquid at the bottom of the tower C was an ammonium carbonate solution of 25.1% concentration and an ammonia to carbon dioxide molar ratio of 3.0:1. The solution was delivered at normal pressure to the tower D, the upper section of which was maintained at 50° C., and the middle and lower sections of which were not heated. The amount of ammonia released was such as to reduce the ammonia to carbon dioxide molar ratio in the solution to 2.3:1. In this example the recycling of the solution between the towers D and C was effected in a manner similar to where the operation was made at atmospheric pressure. As a consequence the amount of methane required in stripping the ammonia in this example was one third as much as that required in Example 1 which operates throughout at atmospheric pressure.

*Example 3*

An equal amount of methane to that required for operating the system at atmospheric pressure was blown into the tower D under otherwise similar operating conditions to those in Example 2, and in this instance similar effects of separation were obtained. The amount of solution to be recycled between the towers D and C was entirely obviated.

As many apparently widely different embodiments of this invention can be made without departing from the spirit and scope thereof, it is to be understood that the invention is not limited to the specific embodiments thereof except as defined in the claims.

What is claimed is:

1. A method of separating ammonia from hydrogen cyanide contained in a gaseous mixture thereof comprising the steps of subjecting said mixture to the action of carbon dioxide and water at temperatures below about 70° C. to form an aqueous solution of carbonates of ammonia, the amount of carbon dioxide employed being at least 1 mol for each mol of ammonia in said mixture, and removing said aqueous solution from the remaining gas which contains hydrogen cyanide.

2. The method in accordance with claim 1 including the additional steps of separating carbon dioxide from said removed aqueous solution and recycling said carbon dioxide to said ammonium carbonate-forming step.

3. The method in accordance with claim 2 including the additional steps of stripping ammonia from said carbon dioxide-impoverished ammonium carbonate solution by passing a hydrocarbon gas therethrough to form a mixture of ammonia and hydrocarbon gas suitable for the synthesis of hydrogen cyanide.

4. The improved method in accordance with claim 1 wherein said solution is maintained at a temperature of 50° C. to 70° C. and the gas phase contacting said solution is maintained at a temperature of 30° C. to 50° C.

5. The method of separating ammonia from hydrogen cyanide contained in a synthesized gas obtained in the production of hydrogen cyanide wherein hydrocarbon and ammonia are employed as reactant gases, comprising subjecting at temperatures, below about 70° C. said gas in a first separation tower to a counter-current flow of water entering from the top and carbon dioxide introduced at the bottom of said tower in an amount of at least 1 mol per mol of ammonia in said gas to separate said ammonia from said synthesized gas and form a first aqueous solution containing carbonates of ammonia in the bottom of said tower, removing the resulting ammonia-impoverished gas from said tower, conducting said first aqueous solution to a second separation tower, liberating carbon dioxide from said first aqeous solution in said second tower to form an ammonia-enriched second aqueous solution and recycling said liberated carbon dioxide to said first tower, conducting said second ammonia-enriched aqueous solution to a third separation tower, liberating ammonia from said second solution by means of a gaseous hydrocarbon to form a mixture of hydrocarbon and ammonia and to form a third aqueous solution containing ammonia and carbon dioxide but being impoverished in ammonia and recycling said hydrocarbon and ammonia mixture for hydrogen cyanide synthesis.

6. The improved method in accordance with claim 5 wherein the carbon dioxide is introduced into said first tower at a molar rate of 1 to 5 times that of the ammonia introduced therein with the synthesized gas, the water is introduced into said first tower at a rate sufficient to dissolve the carbonates of ammonia formed therein, and the temperature in the upper part of said first tower is maintained at 30° C. to 50° C. and in the lower part at 50° C. to 70° C.

7. The improved method in accordance with claim 5 wherein the temperature in the upper part of said second separation tower is between 30° C. and 60° C. and the bottom part thereof is between 70° C. and 90° C., the temperature in the upper part of said third tower is between 20° C. and 60° C., and including the steps of conducting a part of said third aqueous solution to a fourth, dehumidifying tower the lower part of which is maintained at a temperature of 100° C. to 110° C. to release the ammonia and carbon dioxide from said third aqueous solution, recycling said released ammonia and carbon dioxide to said second separation tower, and recycling the remainder of said third aqueous solution to said second separation tower.

8. The improved method in accordance with claim 5 wherein the gas pressure in said first separation tower is greater than atmospheric pressure.

9. The improved method in accordance with claim 5 wherein the gas pressure in said second separation tower is greater than atmospheric pressure.

10. The improved method in accordance with claim 9 wherein said pressure is between 2 kg./cm.$^2$ and 5 kg./cm.$^2$.

11. The improved method in accordance with claim 7, wherein the carbon dioxide is introduced into said first tower at a molar rate of 1 to 5 times that of the ammonia introduced therein with the synthesized gas, the water is introduced into said first tower at a rate sufficient to dissolve the carbonates of ammonia formed therein, the temperature in the upper part of said first tower is maintained at 30° C. to 50° C. and in the lower part at 50° C. to 70° C.

12. A method of separating ammonia from hydrogen cyanide contained in a gaseous mixture thereof comprising the steps of subjecting said mixture at temperatures below about 70° C. to the action of carbon dioxide in an amount of at least 1 mol per mol of ammonia contained by said mixture and water to form an aqueous solution of carbonates of ammonia, removing said aqueous solution from the remaining gas which contains hydrogen cyanide, separating carbon dioxide from said removed aqueous solution, recycling said carbon dioxide to said ammonium carbonate-forming step, and stripping ammonia from said carbon dioxide-impoverished ammonium carbonate solution by passing a hydrocarbon gas therethrough to form a mixture of ammonia and hydrocarbon gas suitable for the synthesis of hydrogen cyanide.

13. The method of separating ammonia from hydrogen cyanide contained in a synthesized gas obtained in the production of hydrogen cyanide wherein hydrocarbon and ammonia are employed as reactant gases, comprising conducting said gas into a separation tower maintained at temperatures below about 70° C. containing descending water from the top and carbon dioxide in an amount of at least 1 mol per mol of ammonia in said gas introduced at the bottom of said tower to separate said ammonia from said synthesized gas and form a first aqueous solution containing carbonates of ammonia in the bottom of said tower, and removing the resulting ammonia-impoverished, hydrogen cyanide-containing gas from said tower.

14. The method of separating ammonia from hydrogen cyanide contained in a synthesized gas obtained in the production of hydrogen cyanide wherein hydrocarbon and ammonia are employed as reactant gases, comprising subjecting said gas in a first separation tower to a counter-current flow of water entering from the top and carbon dioxide introduced at the bottom of said tower in an amount of at least 1 mol per mol of ammonia in said gas to separate said ammonia from said synthesized gas and form an aqueous solution containing carbonates of ammonia in the bottom of said tower, removing the resulting ammonia-impoverished, hydrogen cyanide-containing gas from said tower, conducting said aqueous solution to a second separation tower, liberating carbon dioxide from said aqueous solution in said second tower and recycling said liberated carbon dioxide to said first tower.

15. A method of separating carbon dioxide and ammonia from an aqueous solution containing about 1 to 1.5 mols of ammonia per mol of carbon dioxide to form a substantially ammonia-free carbon dioxide and a hydrocarbon-ammonia mixture suitable for hydrogen cyanide synthesis, comprising the steps of contacting said solution at a temperature between 30 and 60° C. with a counter-current flow of a gaseous mixture of carbon dioxide and ammonia at a temperature of 70 to 90° C., said mixture initially containing a molar ratio of ammonia to carbon dioxide of about 2:1, to form a second aqueous solution of ammonium carbonates enriched in ammonia and a substantially ammonia-free carbon dioxide gas, separating said second aqueous solution from said gas, and containing at a temperature from about 20 to 60° C. said second aqueous solution with a hydrocarbon gas to form a hydrocarbon-ammonia mixture suitable for the synthesis of hydrogen cyanide and a third aqueous solution of ammonium carbonates impoverished in ammonia.

16. A method of separating carbon dioxide and ammonia from an aqueous solution containing about 1 to 1.5 mols of ammonia per mol of carbon dioxide to form a substantially ammonia-free carbon-dioxide and a hydrocarbon-ammonia mixture suitable for hydrogen cyanide synthesis, comprising the steps of contacting said solution at a temperature of about 30 to 60° C. with a gaseous mixture of carbon dioxide and ammonia at a temperature of about 70 to 90° C., said mixture initially containing a molar ratio of ammonia to carbon dioxide of about 2:1, to form a second aqueous solution of ammonium carbonates enriched in ammonia and a substantially ammonia-free carbon dioxide gas, separating said second aqueous solution from said gas, contacting at temperatures of about 20 to 60° C. said second aqueous solution with a hydrocarbon gas to form a hydrocarbon-ammonia mixture suitable for the synthesis of hydrogen cyanide and a third aqueous solution of ammonium carbonates impoverished in ammonia, separating said third aqueous solution from said hydrocarbon-ammonia mixture, heating said third solution to form said gaseous mixture of ammonia and carbon dioxide suitable for recycling a contact with first-mentioned aqueous solution.

17. In a method of manufacturing hydrogen cyanide by reacting ammonia, gaseous hydrocarbon and oxygen to produce a gaseous mixture containing hydrogen cyanide, ammonia and carbon dioxide wherein said gaseous mixture is treated to remove carbon dioxide and ammonia as an aqueous solution thereof, the improvement of forming a reactant gas mixture containing ammonia and gaseous hydrocarbon suitable for use in synthesizing hydrogen cyanide on admixture with oxygen, comprising treating said aqueous solution to provide thereto an ammonia to carbon dioxide molar ratio in the range from 2.8 to 3.0 and thereafter passing at a temperature of about 20 to 60° C. a hydrocarbon gas through said aqueous solution to remove ammonia therefrom and form a gaseous mixture containing ammonia and said hydrocarbon gas which mixture is suitable for use in hydrogen cyanide synthesis.

References Cited in the file of this patent

UNITED STATES PATENTS 2,086,171    Neubner _____ July 6, 1937

FOREIGN PATENTS

2819/26    Australia _____ Dec. 14, 1926
697,505    Great Britain _____ Sept. 23, 1953